United States Patent [19]

Rathbone et al.

[11] 4,155,850

[45] May 22, 1979

[54] FLUIDIC FILTERS

[75] Inventors: Richard Rathbone, Coventry; Peter L. Watts; George Orloff, both of Solihull; George A. Blandford, Coventry, all of England

[73] Assignee: Lucas Industries Limited, Birmingham, England

[21] Appl. No.: 870,875

[22] Filed: Jan. 20, 1978

[30] Foreign Application Priority Data

Jan. 27, 1977 [GB] United Kingdom ............... 3285/77

[51] Int. Cl.² ...................... B01D 29/38; B01D 35/12
[52] U.S. Cl. ..................................... 210/98; 210/102; 210/108; 210/333 A; 210/341; 138/41
[58] Field of Search ............... 210/98, 102, 108, 117, 210/118, 333.1, 340, 341; 138/41, 45

[56] References Cited

U.S. PATENT DOCUMENTS

| | | | |
|---|---|---|---|
| 2,670,596 | 3/1954 | Whitworth | 138/41 |
| 2,878,836 | 3/1959 | Binks | 138/45 |
| 3,016,066 | 1/1962 | Warren | 137/624 |
| 3,077,903 | 2/1963 | Honsinger | 138/45 |
| 3,388,799 | 6/1968 | Rymer | 210/102 |
| 3,630,362 | 12/1971 | Matthews | 210/108 |
| 3,868,322 | 2/1975 | Orloff | 210/108 |

FOREIGN PATENT DOCUMENTS 1297154 11/1972 United Kingdom.

OTHER PUBLICATIONS

Chemical Engineers' Handbook, 5th Edition, Perry et al., McGraw-Hill Book Co., 1973, pp. 20-102.
Process Control by Power Fluidics, Direct Fluidic Control Symposium, 9/23/75, Inst. of Meas. and Control, pp. 9-1 to 9-18.

*Primary Examiner*—Charles N. Hart
*Assistant Examiner*—David R. Sadowski

[57] ABSTRACT

A self-cleaning filter device comprises a fluidic oscillator having a pair of passages through which fluid is directed alternately, and filter elements which fluid can flow from said passages to an auxiliary outlet. A main outlet communicates with the passages in such a way that the filter elements do not impede fluid flow to the main outlet. Between each passage and the main outlet is a device which provides a higher impedance to flow from the main outlet to the passages than to flow in the opposite direction, and assists the self-cleaning action of the filter elements by increase the difference between the fluid pressures in the passages.

5 Claims, 13 Drawing Figures

FLUIDIC FILTERS

This invention relates to self cleaning filter devices of the type in which fluid flow through a filter element is periodically reversed in order to clean the element.

It is known to provide filter devices of the foregoing type, in which flow reversal is intiated by clogging of the filter elements. In such arrangements there will necessarily be a substantial reduction in the rate of flow of filtered fluid immediately prior to flow reversal. It is therefore desirable that flow reversal shall be sufficiently frequent as to prevent the filter elements from becoming significantly clogged.

It may be required, moreover, that filtered fluid is to be drawn from a larger main flow stream for which the filtration requirements are less stringent, and which does not therefore require to be passed through the filter elements. In these latter circumstances any particles dislodged during reverse flow may be allowed to re-enter the main flow stream, provided that the flow reversals are sufficiently frequent as to prevent large quantities of particles being discharged into the main flow stream at one time.

It is also desirable to ensure that the pressure difference across a filter element during flow reversal is high enough to dislodge a sufficient number of particles which may be embedded in the filter element.

According to the invention a self cleaning filter device comprises a fluidic oscillator having an inlet, first and second passages into which fluid can flow from said inlet, a pair of auxiliary outlets respectively communicating with said first and second passages, a pair of filter elements through which fluid can flow from said first and second passages to respective ones of said auxiliary outlets, a further passage interconnecting said auxiliary outlets a filtered fluid outlet cmmunicating with said further passage, a main outlet communicating with said first and second passages and to which fluid can flow from said inlet unimpeded by said filter elements, and flow control means between said first and second passages and said main outlet, said flow control means for providing a higher impedance to flow from said main outlet to said first and second passages than to flow from said first and second passages to said main outlet.

Embodiments of the invention will now be described by way of example only and with reference to the accompanying drawings in which.

Figure 1:
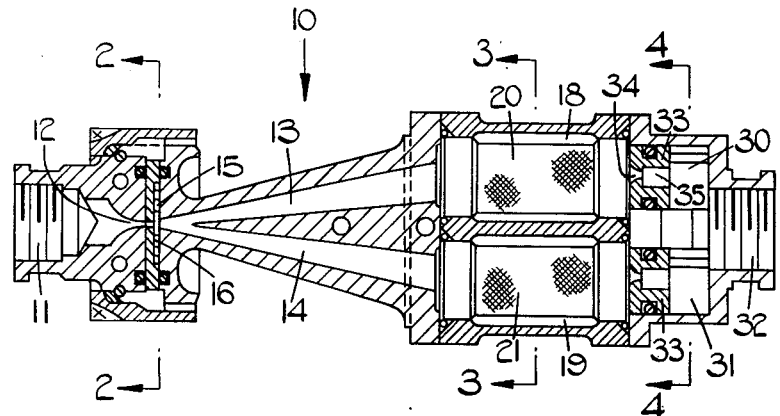
FIG. 1 is a section through a self cleaning filter device.
Figure 2:
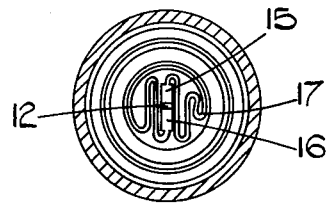
FIGS. 2 and 3 are sections on the corresponding lines in FIG. 1.
Figure 3:
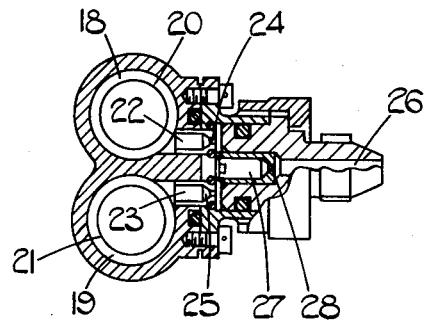

As shown in FIGS. 1 to 5 a self cleaning filter device includes a known type of fluidic oscillator, indicated at 10. The oscillator 10 is a bistable Coanda effect device having an inlet 11, a nozzle 12 and two inclined passages 13,14 whose junction is adjacent the nozzle 12. Control ports 15, 16 are interconnected by a labyrinth passage 17. Such an arrangement provides, as is known, from British Patent 1297154 a fluid oscillator in which the flow from the nozzle 12 is switched between the passages 13, 14 at a rate determined by the throughput, the mechanics of oscillation being more particularly described in U.S. Pat. No. 3,016,066. The passages 13, 14 communicate with respective filter chambers 18, 19. Extending through the chambers 18, 19 are respective cylindrical filter elements 20, 21 along the central passages of which fluid can flow without obstruction. Fluid can, however, be drawn off through auxiliary outlets 22,23, and this fluid must pass through respective ones of the filter elements 20, 21.

Two identical restrictors 24, 25 are connected in series between the auxiliary outlets 22,23. The junction of the restrictors 24, 25 is connected to a filtered fluid outlet 26 via a chamber 27 and a further restrictor 28.

Chambers 18, 19 communicate with respective cylindrical outlet passages 30, 31 which in turn communicate with a cylindrical main fluid outlet 32. Within the passages 30, 31 are a pair of inserts 33 which are shown in more detail in FIGS. 4 and 5 and through which fluid flows to the main outlet 32. Each insert 33 has an axial through passage comprising as shown, a convergent flow restricting inlet 34 and a cylindrical outlet 35 of substantially larger diameter than that of the minimum cross section of the inlet 35. The cross section of the flow path increases abruptly to define a wall which faces in the direction of flow and is perpendicular to the flow direction. The inserts 33 have arms 36 which serve to locate the devices within the outlet passages 30, 31.

In use, flow through the device is switched between the passages 13, 14 at a rate determined by the volume flow. In one state of the oscillator 10 the major part of the fluid flowing in passage 13 passes through the bore of the filter element 20 to the main outlet 32, but a proportion of this fluid passes outwardly through the elements 20 and restrictor 24. Some of this filtered fluid may be withdrawn through the outlet 26, but a proportion will pass through the restrictor 25 and inwardly through the filter element 21, dislodging particles which may have become embedded in the inner surface of element 21 during the previous switching state of the device. The device operates in a like manner during the next switching state of the device, particles dislodged from inside the filter elements being carried to the outlet 32.

Flow between the elements 20, 21 is dependent on the difference between the pressures inside these elements. It is desirable, therefore, that fluid shall be restrained from flowing back from the outlet 32 into which ever one of the elements 20, 21 is not, for the time being, carrying the main flow. The function of the inserts 33 is such that they present a higher impedance to flow from the main outlet 32 to the chambers 18, 19 than from these chambers to the main outlet 32, thereby acting as fluidic diodes. The action of the inserts 33 thus provides an increase in the pressure difference between the chambers 18, 19 and improves the flow between the filter elements 20, 21.

Figure 6:
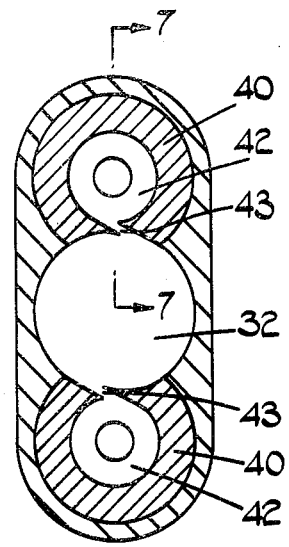
FIG. 6 is a section, corresponding to FIG. 4 of an alternative form of the device.
Figure 5:
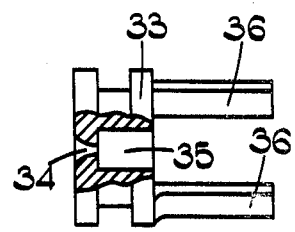
FIG. 5 is a view, on arrow 5 in FIG. 4, of a part of the device.
Figure 7:
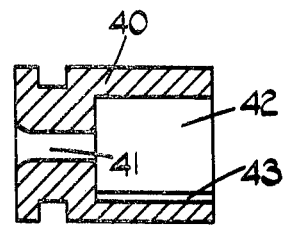
FIG. 7 is a section on line 7—7 in FIG. 6.

FIGS. 6 and 7 show an alternative form of insert 40. Each of the inserts 40 has an axial passage 41 through which fluid can flow to a larger cylindrical bore 42. A flow restricting opening 43 extends through the walls of the insert tangentially of the bore 42 and communicates with the main outlet 32. In use, in either switching state of the device the appropriate opening 43 imparts a clockwise vortex motion to the fluid within outlet 32, as seen in FIG. 6. Flow through each of the openings 43 also creates a vortex in the bore 42 associated with that opening 43. The combined effect of the vortices in the outlet 32 and in the one of the bores 42 which is not carrying the main flow creates a low pressure zone adjacent the outlet of the opening 43 through which main flow is not being directed. This low pressure zone tends to draw fluid from the one of the chambers 20, 21 through which the main fluid flow is not being directed, and maximises the pressure difference between the chambers 18, 19.

Figure 8:
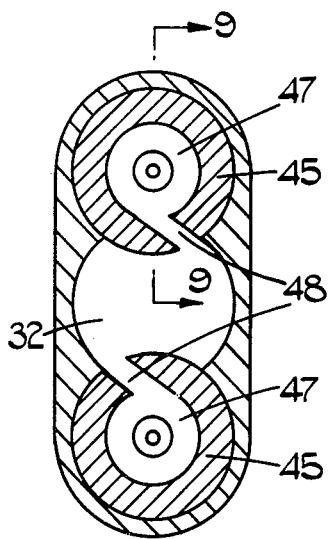
FIG. 8 is a section, also corresponding to FIG. 4, of a further alternative form of the device.
Figure 9:
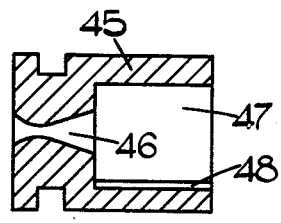
FIG. 9 is a section on line 9—9 in FIG. 8, and FIGS. 10 to 13 respectively show, diagrammatically, four further forms of the device.

FIGS. 8 and 9 show a further form of insert 45. Each of the inserts 45 has an axial restricting inlet in the form of a venturi 46 which communicates with a cylindrical bore 47 and a non-restricting opening 48 which respectively correspond to the bore 42 and opening 43 previously described. In use, the inserts 45 provide an effect which is a combination of the effects of inserts 33 and 40, already described.

Figure 10:
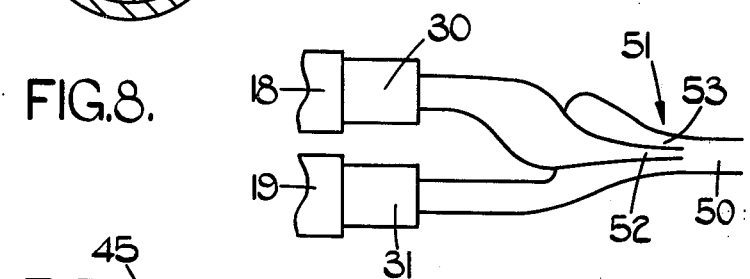

FIG. 10 shows, diagrammatically, the main outlet end of a further alternative form of the device. In this case the outlet passages 30, 31 communicate with a main outlet 50 via an arrangement 51 which acts as a two-way ejector pump. An inner nozzle 52 communicates with the passage 30 and is directed towards the outlet 50 and an annular opening 53 communicates with the passage 31 and outlet 50, and surrounds the nozzle 52. The dimensions of the arrangement are such that when, in one switching state of the device, the main fluid flow is through nozzle 52, this flow will also serve to draw fluid from the passage 31. In the other state of the device a main flow through the opening 53 will serve to draw fluid from the passage 30 through the nozzle 52. The arrangement 51 thus acts to restrain fluid flow from the outlet 50 to either of the passages 30, 31.

Figure 11:
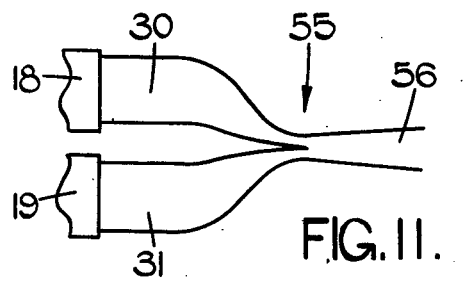

FIG. 11 shows the outlet passages 30, 31 interconnected by a known form of flow junction 55 which is symmetrical about a plane normal to the view shown in the drawing. The junction 55 communicates with a main outlet 56. A junction of the type shown at 55 has been described in a paper "Amplifying Properties of Specially Designed Junctions", by J. R. Tippetts, presented at a symposium at Sheffield, England in September 1975 and available from The Institute of Measurement and Control, 20 Peel Street, London, W8. As disclosed in that paper, in a condition in which fluid flow Qo from the outlet 56 is unrestrained, flow through one of the passages 30, 31 acts as a jet pump to restrain fluid flow back from the outlet 56 to whichever of the chambers 18, 19 is not, for the time being, carrying the main flow.

Figure 4:
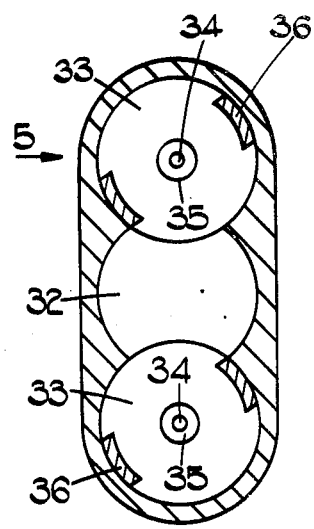
FIG. 4 is a section, to an enlarged scale, on line 4—4 in FIG. 1.
Figure 12:
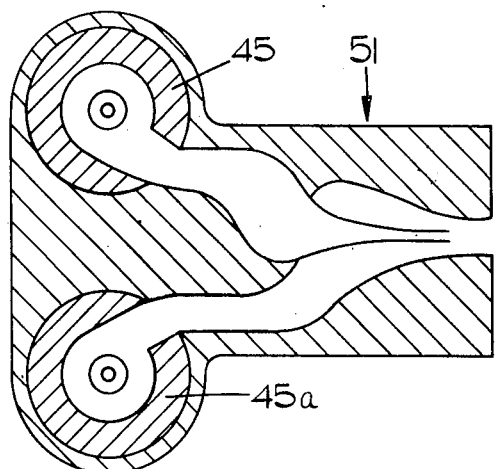

FIG. 12 shows a section corresponding to the sections of FIGS. 4, 6 ad 8 of another form of the device, this form combining the features of the insert 45 (FIG. 9) with the outlet arrangement 51 of FIG. 10. One of the inserts 45a, is in fact, of opposite hand to the insert 45.

Figure 13:
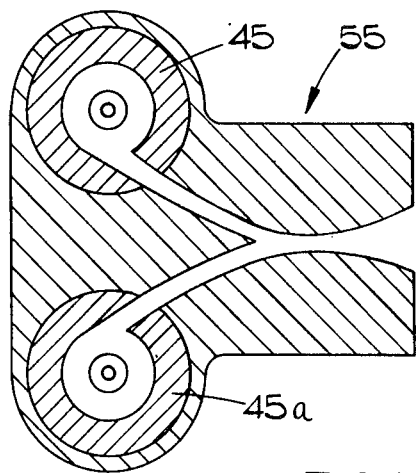

FIG. 13 shows a section, corresponding to that of FIG. 12 of yet another form of the device which combines the features of inserts 45, 45a with the flow junction 55 of FIG. 11.

It will be understood that in FIGS. 12 and 13 an insert 40 (FIG. 7) and an opposite hand insert 40a could be substituted for the inserts 45, 45a respectively.

We claim:

1. A self-cleaning filter device comprising a fluidic oscillator having an inlet, first and second through passages into which fluid can flow from said inlet, a pair of auxiliary outlets respectively communicating with said first and second through passages, a pair of filter elements through which fluid can flow from said first and second through passages to respective ones of said auxiliary outlets, a further passage interconnecting auxiliary outlets, a filtered fluid outlet communicating with said further passage, a main outlet communicating with said first and second through passages and to which fluid can flow from said inlet unimpeded by said filter elements, and a pair of flow control means between respective ones of said first and second through passages and said main outlet, each said flow control means comprising a first cylindrical chamber in axial communication with a respective one of said through passages and an opening extending tangentially from said cylindrical chamber, each of said openings communicating with said main outlet.

2. A device as claimed in claim 1 in which said main outlet includes a further cylindrical chamber with which said openings communicate tangentially.

3. A device as claimed in claim 1 in which each of said flow control devices includes a flow restricting inlet.

4. A device as claimed in claim 1 which includes first and second concentric nozzles connected to receive fluid from respective ones of said tangential openings.

5. A device as claimed in claim 1 which includes means for providing a junction between said tangential openings so that fluid flow through either one of said tangential openings towards said main outlet acts as a jet pump to cause fluid to be drawn towards said main outlet from the other of said tangential openings.

* * * * *